United States Patent [19]

Kanamaru et al.

[11] Patent Number: 4,510,592
[45] Date of Patent: Apr. 9, 1985

[54] DISK CLAMPING DEVICE

[75] Inventors: Hitashi Kanamaru; Fumio Kadoo, both of Saitama, Japan

[73] Assignee: Universal Pioneer Corporation, Tokyo, Japan

[21] Appl. No.: 649,973

[22] Filed: Sep. 12, 1984

Related U.S. Application Data

[63] Continuation of Ser. No. 453,672, Dec. 27, 1982, which is a continuation of Ser. No. 225,090, Jan. 14, 1982, which is a continuation-in-part of Ser. No. 55,120, Jul. 5, 1979.

[30] Foreign Application Priority Data

Jul. 5, 1978 [JP] Japan ................. 53-92501
Nov. 7, 1978 [JP] Japan ................ 53-152989

[51] Int. Cl.³ .................. G11B 3/62; G11B 17/00
[52] U.S. Cl. .................... 369/270; 360/97; 346/137
[58] Field of Search ........... 369/270, 271; 360/97, 360/99; 346/137, 135

[56] References Cited

U.S. PATENT DOCUMENTS

| | | | |
|---|---|---|---|
| 3,658,347 | 4/1972 | Cheeseboro | 369/270 |
| 3,891,796 | 6/1975 | Takahara et al. | 369/270 |
| 4,002,826 | 1/1977 | Iemenschot | 369/270 |
| 4,068,851 | 1/1978 | Yamamura | 369/270 |
| 4,340,955 | 7/1982 | Elliott | 369/270 |

FOREIGN PATENT DOCUMENTS

| | | | |
|---|---|---|---|
| 539492 | 9/1941 | United Kingdom | 369/77 |
| 1095242 | 12/1967 | United Kingdom | . |

Primary Examiner—Steven L. Stephan
Attorney, Agent, or Firm—Sughrue, Mion, Zinn, Macpeak & Seas

[57] ABSTRACT

A disk clamping device having a turntable fixedly secured at a predetermined height to a spindle. A clamper is adapted to depress the disk against the turntable. A movable ring is slidable in parallel with said spindle and a member having a conical outer wall is slidable in parallel with the spindle while being in contact therewith. A magnet is positioned by a yoke or plate to form a magnetic circuit with the magnetic flux clamping the disk. The center of the disk coincides with the center of rotation of the spindle when the disk together with the movable ring and the conical member is moved downwardly while in contact with the conical member and maintained horizontal by said movable ring. The disk is clamped at a predetermined height when it is brought into contact with the turntable.

22 Claims, 4 Drawing Figures

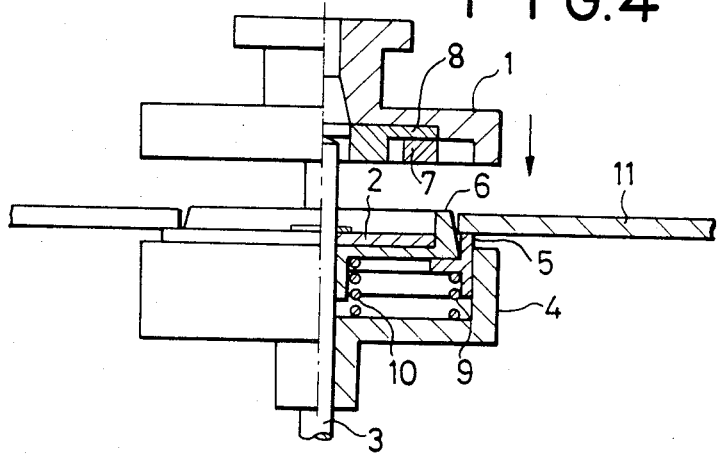

DISK CLAMPING DEVICE

This is a continuation of application Ser. No. 453,672, filed 12/27/82, which is a continuation of application Ser. No. 225,090 filed 1/14/81, which is a continuation in part of application Ser. No. 55,120, filed 7/5/79.

BACKGROUND OF THE INVENTION

This invention relates to a disk clamping device for clamping a disk such as a video disk.

In order to satisfactorily clamp an information record carrier such as a video disk to a reproducing device, the following conditions must be satisfied: First, the disk must be kept horizontal. Second, the center of the disk should coincide with the center of rotation of the turntable. Third, the static height of the disk on the reproducing device should be maintained unchanged. Fourth, the disk must be strongly held on the reproducing device. If these conditions are not met, then it is difficult to maintain the distance between the disk and an optical reading device (such as a lens) or the like unchanged, and to correctly follow the track on the disk. In a worst case, the disk may come off the turntable during the operation.

SUMMARY OF THE INVENTION

Accordingly, an object of this invention is to provide a disk clamping device which fully satisfies these conditions.

It is another object of this invention to provide a disk clamping device for a video disk that is easily used and reliable in operation.

These and other objects of this invention are attained in a disk clamping device having a turntable fixedly secured to a spindle at a predetermined height. A movable ring is slidable in parallel with the spindle and a conical member has a conical outer wall and is slidable in parallel with the spindle while being in contact therewith. A clamper is adapted to depress a disk toward the turntable. A magnet positioned by a yoke forms a magnetic circuit to clamp the disk with magnetic flux. The center of the disk coincides with the center of rotation of the spindle when the disk together with the movable ring and the conical member is moved downwardly while in contact with the conical member and maintained horizontal by the movable ring. The disk is clamped at a predetermined height when it is brough into contact with the turntable.

BRIEF DESCRIPTION OF THE DRAWINGS

FIG. 4 shows an embodiment wherein a magnet and a yoke are secured to a clamping means.

DESCRIPTION OF THE PREFERRED EMBODIMENT

Figure 2:
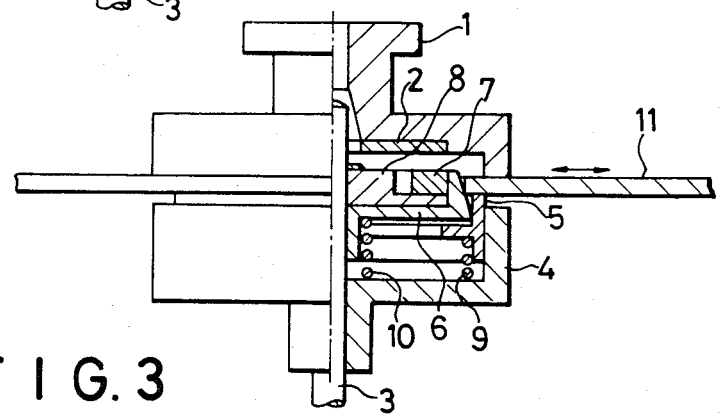
Figure 3:
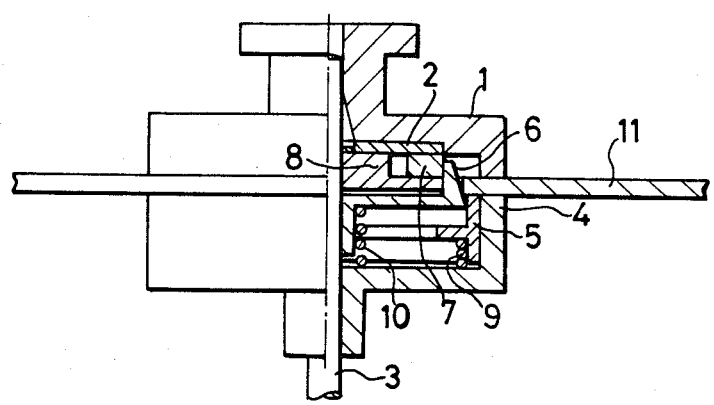

A first embodiment of a disk clamping device according to the invention will be described with reference to FIGS. 1-3. In these figures, reference numeral 1 designates a clamper. A plate 2 is fixedly secured to the clamper. A spindle 3 is rotated by an electric motor (not shown) having a turntable 4 fixedly mounted thereon. A movable ring 5 is slidable along the inner wall of the turntable 4 and a conical member 6 is slidable along the outer wall of the spindle 3. A yoke 8 is fixedly secured to the spindle 3, and a magnet 7 is fixedly secured to the yoke 8. A first spring 9 is adapted to energize the movable ring 5 upwardly and a second spring 10 is adapted to energize the conical member 6 upwardly. Finally, a disk 11 is shown.

Figure 1:
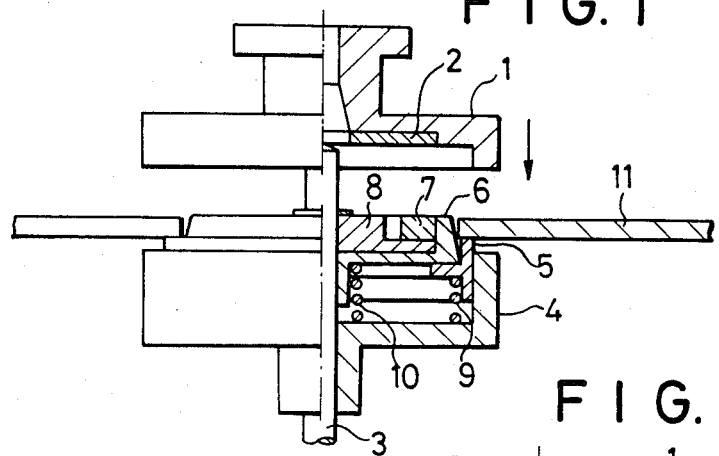
FIGS. 1 through 3 are sectional views of one example of a disk clamping device according to this invention.

In order to mount the disk 11 on a reproducing device, first the disk is placed on the movable ring 5 as shown in FIG. 1. In this case, the disk 11 is not substantially in contact with the conical member 6, and therefore it is in parallel with the turntable 4.

Then, the clamper 1 is placed over the spindle 3. In this operation, the clamper 1 depresses both the disk 11 and the movable ring 5 downwardly against the elastic force of the spring 9. The conical member 6 has a conical part which is larger in diameter towards its bottom. Therefore, when the disk 11 is depressed downwardly to a certain extent, then the disk 11 is brought into contact with the conical member 6.

When the clamper 1 is further depressed, then the conical member 6 is moved downwardly by the disk 11 against the elastic force of the spring 10. In this operation, since the conical member 6 cannot be moved radially, the disk 11 is moved horizontally (radially) by the reaction of the conical member 6 while being held horizontal by the movable ring 5, so that the center of the disk 11 coincides with the center of rotation of the spindle 3 (cf. FIG. 2).

The surfaces of the clamper 1, the movable ring 5 and the conical member 6 which are brought into contact with the disk 11 are, for instance, finely finished (machined) to minimize the coefficients of friction thereof, so that the disk 11 can smoothly slide.

As the clamper 1 is further moved downwardly, the disk 11 is moved downwardly with its center coinciding with the center of rotation of the spindle 3 until it is brought into contact with the turntable 4. In that position, the magnet 7, the yoke 8 and the plate 2 form a magnetic circuit in which magnetic flux is extended to strongly clamp the disk 11 (cf. FIG. 3).

The surface of the turntable 4 which is brought into contact with the disk 11 may be coated with rubber, Teflon or the like or coarsely finished to increase the coefficient of friction thereof, thereby to prevent slip between the turntable 4 and the disk 11.

As is apparent from the above description, according to the invention, first the disk 11 is held horizontal by the movable ring 5, and then the disk 11 is brought into contact with the conical member 6. Therefore, the disk 11 will never be brought into engagement, in an inclined state, with the conical member 6, and therefore the center of the disk 11 can positively coincide with the center of rotation of the spindle 3. Furthermore, the annular surface of the movable ring 5 is in contact with the inner wall of the turntable 4, and therefore the movable ring 5 can be moved vertically while being horizontal at all times.

Since the conical member 6 slides along the outer wall of the spindle 3, the center of the conical member 6 is not shifted from the center of rotation of the spindle 3. The disk 11 is finally held in contact with the turntable 4 fixedly secured to the spindle 3, and accordingly the static height of the disk 11 on the reproducing device is maintained unchanged. Therefore, the height of a reading means (such as a lens means) on the reproducing device can be set irrespective of the fluctuations of clamping state.

The disk 11 can be correctly clamped by varying the coefficients of friction of the surfaces of the components which are brought into contact with the disk. The clamping force is as noted provided by the magnetic circuit formed by the magnet 7, the yoke 8 and the plate 2. Therefore, the clamping force is several times as strong as that obtained in the case where no magnetic circuit is formed. Accordingly, a small magnet can be utilized in a narrow space.

Although the present invention has been described with respect to a specific example, it will be appreciated by one skilled in the art that a variety of changes may be made without departing from the scope of the invention. For example, the plate 2 which, in the above-described example, is secured to the clamper 1 may be fixedly secured to the spindle 3 and the yoke 8 and the magnet 7 may be fixedly secured to the clamper 1, as shown in FIG. 4 so that the magnetic circuit is formed by the magnet 7, the yoke 8 and the plate 2.

What is claimed is:

1. A disk clamping device, comprising:
   a turntable adapted to rotate a disk loaded thereon, and a spindle secured to said turntable for rotation therewith, said turntable being secured to said spindle at a predetermined height;
   clamping means adapted to depress said disk against said turntable, said clamping means including a plate member;
   a magnet and positioning means for positioning said magnet relative to said spindle, said magnet and said plate member forming a magnetic circuit in which magnetic flux is extended to clamp said disk to said turntable;
   conical centering means for causing a center of said disk to coincide with an axis of rotation of said spindle when said disk is moved downwardly by said clamping means, whereby, said disk is clamped at a second predetermined height when said disk is brought into contact with said turntable; and
   a movable ring having a substantially planar upper surface for supporting said disk, said movable ring being movably supported on said turntable for parallel movement relative to said spindle, said movable ring being operable to maintain said disk horizontal as said clamping means depresses said disk into engagement with said turntable, first and second means for upwardly biasing said centering means and said movable ring, respectively, relative to said turntable.

2. The clamping device of claim 1 wherein said centering means has a conical outer wall and a portion in sliding contact with said spindle, said centering means being slidable in a direction parallel to said spindle.

3. The clamping device of claim 2 wherein said positioning means comprises a yoke.

4. The clamping device of claim 3 wherein said yoke is fixed to said spindle.

5. The clamping device of claim 2 wherein said movable ring is slidable in parallel with said spindle and said centering means and is in contact with said centering means.

6. A disk clamping device comprising:
   a turntable fixedly secured to a spindle at a predetermined height;
   a movable ring having a substantially planar upper surface for supporting said disk, said movable ring being movably supported on said turntable for parallel movement relative to said spindle, and first means for biasing said ring upwardly relative to said turntable;
   a member having a conical outer wall, said member being slidable in parallel with an axis of said spindle in contact with said spindle, and second means for upwardly biasing said member relative to said turntable; and
   a clamper adapted to depress a disk toward said turntable;
   a center of said disk coinciding with a center of rotation of said spindle when said disk, together with said movable ring and said conical member, are moved downwardly while in contact with said conical member and maintained horizontal by said movable ring;
   said disk being clamped at a predetermined height when it is brought into contact with said turntable.

7. The clamping device of claim 6 further comprising a magnet and magnet positioning means.

8. The clamping device of claim 7 wherein said magnet positioning means comprises a yoke member, said yoke member forming a magnetic circuit together with the magnet.

9. The clamping device of claim 7 wherein said clamper further comprises a plate mounted thereon, wherein said magnet, said magnet positioning means and said plate form said magnetic circuit.

10. A disk clamping device comprising:
    a turntable adapted to rotate a disk loaded thereon, and a spindle secured to said turntable for rotation therewith;
    clamping means adapted to depress said disk against said turntable, said clamping means including a magnet and a yoke;
    a plate member fixed to said spindle, wherein said magnet, said yoke and said plate member form a magnetic circuit in which magnetic flux is extended to clamp said disk to said turntable;
    said turntable being secured to said spindle at a predetermined height;
    conical centering means for causing a center of said disk to coincide with an axis of rotation of said spindle when said disk is moved downwardly by said clamping means, whereby, said disk is clamped at a predetermined height when said disk is brought into contact with said turntable; and
    a movable ring having a substantially planar upper surface for supporting said disk, said ring being movably supported on said turntable for parallel movement relative to said spindle, said movable ring being operable to maintain said disk horizontal as said clamping means depresses said disk into engagement with said turntable, first and second means for upwardly biasing said centering means and said ring, respectively, relative to said turntable.

11. A disk clamping device for use in a disk player, comprising:
    a rotatable drive spindle;
    a rotatable turntable adapted to support a disk and being fixed to said drive spindle for rotation therewith, said turntable having a positioning surface which is perpendicular to its axis of rotation;
    disk loading means separable from said disk for moving said disk downwardly with selective and slidable engagement and applying pressure to said disk to ensure contact between said disk and the turntable, said disk loading means including a magnetic circuit formed by a magnet which serves as an energy source, a yoke which cooperates with the magnet and which defines a magnetic gap, and a magnetic plate, said magnetic circuit being changeable between open and closed states wherein said magnetic plate is separated from said magnet and said yoke and whereat said magnetic plate is in contact with at least one of said yoke and said magnet, respectively, and wherein one of the yoke and the magnetic plate is fixed to said drive spindle; and conical centering means in contact with the circumference of a circular aperture in said disk for causing the center of said aperture to conicide with an axis of rotation of said spindle when said disk is moved downwardly by said disk loading means, whereby said disk is clamped at a predetermined height when said disk is brought into contact with said turntable.

12. The disk clamping device of claim 11 wherein said disk loading means also includes a clamper which is selectively engageable with said disk so as to move said disk axially of said turntable until said disk engages said turntable, whereby said disk is positioned on the positioning surface of said turntable.

13. The disk clamping device of claim 12, wherein the magnet and the yoke are secured to said clamper and are arranged to engage the magnetic plate when said disk engages said turntable.

14. A disk clamping device for use in a disk player, comprising:
   a rotatable drive spindle;
   a rotatable turntable adapted to support a disk and being fixed to said drive spindle for rotation therewith, said turntable having a positioning surface which is perpendicular to its axis of rotation;
   a support member which is movable relative to said turntable in a direction parallel to the direction of rotation of the turntable and which is arranged to support said disk initially in axially spaced relation to said turntable;
   disk loading means for moving said disk downwardly and for applying pressure to said disk to ensure contact between said disk and the turntable, said disk loading means including a magnetic circuit formed by a magnet which serves as an energy source, a yoke which cooperates with the magnet and which defines a magnetic gap, and a magnetic plate enabling the magnetic circuit to be changed between open and closed states, and wherein one of the yoke and the magnetic plate is fixed to said drive spindle; and
   conical centering means for causing a center of said disk to coincide with an axis of rotation of said spindle when said disk is moved downwardly by said disk loading means, whereby said disk is clamped at a predetermined height when said disk is brought into contact with said turntable.

15. The disk clamping device of claim 14, wherein the magnet is supported by the yoke, and the yoke is axially fixed with respect to said turntable.

16. The disk clamping device of claim 14 wherein said disk loading means also includes a clamper which is engageable with said disk so as to move said disk axially of said turntable until said disk engages said turntable, whereby said disk is positioned on the positioning surface of said turntable.

17. The disk clamping device of claim 15 wherein said disk loading means also includes a clamper which is engageable with said disk so as to move said disk axially of said turntable until said disk engages said turntable, whereby said disk is positioned on the positioning surface of said turntable.

18. The disk clamping device of claim 16, wherein the magnetic plate is secured to said clamper and is arranged to engage the magnet when said disk engages said turntable.

19. The disk clamping device of claim 17, wherein the magnetic plate is secured to said clamper and is arranged to engage the magnet when said disk engages said turntable.

20. The disk clamping device of claim 16, wherein the magnet and the yoke are secured to said clamper and are arranged to engage the magnetic plate when said disk engages said turntable.

21. The disk clamping device of claim 17, wherein the magnet and the yoke are secured to said clamper and are arranged to engage the magnetic plate when said disk engages said turntable.

22. A disk clamping device for use in a disk player, comprising:
   a rotatable drive spindle;
   a rotatable turntable adapted to support a disk and being fixed to said drive spindle for rotation therewith, said turntable having a positioning surface which is perpendicular to its axis of rotation;
   disk loading means for moving said disk downwardly and for applying pressure to said disk to ensure contact between said disk and the turntable, said disk loading means including a clamper engageable with said disk so as to move said disk axially of said turntable until said disk engages said turntable, whereby said disk is positioned on the positioning surface of the turntable, and said disk loading means further including a magnetic circuit formed by a magnet which serves as an energy source, a yoke which cooperates with the magnet and which defines a magnetic gap, and a magnetic plate secured to said clamper and arranged to engage the magnet when said disk engages said turntable for enabling the magnetic circuit to be changed between open and closed states, and wherein one of the yoke and the magnetic plate is fixed to said drive spindle; and
   conical centering means for causing a center of said disk to coincide with an axis of rotation of said spindle when said disk is moved downwardly by said disk loading means, whereby said disk is clamped at a predetermined height when said disk is brought into contact with said turntable.

* * * * *